(12) United States Patent
Lu et al.

(10) Patent No.: US 12,294,904 B2
(45) Date of Patent: May 6, 2025

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 369 days.

(21) Appl. No.: 17/672,237

(22) Filed: Feb. 15, 2022

(65) Prior Publication Data

US 2022/0174568 A1    Jun. 2, 2022

Related U.S. Application Data

(63) Continuation of application No. PCT/CN2019/100879, filed on Aug. 15, 2019.

(51) Int. Cl.
*H04W 36/08* (2009.01)

(52) U.S. Cl.
CPC .................................. *H04W 36/08* (2013.01)

(58) Field of Classification Search
CPC . H04W 36/08; H04W 36/0072; H04W 72/56; H04W 48/18
USPC ........................................................ 370/331
See application file for complete search history.

(56) References Cited

U.S. PATENT DOCUMENTS

2021/0385710 A1* 12/2021 Jin ..................... H04W 36/0072
2022/0104081 A1*  3/2022 Wang ..................... H04W 48/18

FOREIGN PATENT DOCUMENTS

| CN | 105246025 A   | 1/2016  |
|----|---------------|---------|
| CN | 107079386 A   | 8/2017  |
| CN | 107852727 A   | 3/2018  |
| CN | 108605329 A   | 9/2018  |
| WO | 2018199728 A1 | 11/2018 |
| WO | 2018228294 A1 | 12/2018 |
| WO | 2019054783 A1 | 3/2019  |
| WO | 2019064228 A2 | 4/2019  |

OTHER PUBLICATIONS

Huawei, "Cell reselection for V2X SL communication in NR", May 13-17, 2019, R2-1907458. (From Applicant's IDS) (Year: 2019).*
LG Electronics Inc., Cell reselection for NR V2X sidelink communication, R2-1818425, 3GPP TSG-RAN WG2 #104, Spokane, USA, Nov. 12-16, 2018.

(Continued)

*Primary Examiner* — Mang Hang Yeung
(74) *Attorney, Agent, or Firm* — Ladas & Parry LLP (57) ABSTRACT

Embodiments of the present application provide a wireless communication method and a terminal device, in which cell reselection can be performed under a circumstance that the terminal device supports both LTE sidelink communication and NR sidelink communication. The wireless communication method includes: the terminal device determining a carrier priority order of multiple carriers used for cell reselection according to a carrier attribute, where the carrier attribute is for sidelink communication of at least two networks.

12 Claims, 2 Drawing Sheets

(56) References Cited

OTHER PUBLICATIONS

The first Office Action of corresponding Chinese application No. 202210054631.6, dated Apr. 20, 2023.
The second Office Action of corresponding Chinese application No. 202210054631.6, dated Jun. 28, 2023.
International Search Report (ISR) dated Apr. 28, 2020 for Application No. PCT/CN2019/100879.
Huawei et al. "Cell Reselection for V2X SL Communication in NR" 3GPP TSG-RAN WG2 Meeting#106, R2-1907468, May 2, 2019(May 2, 2019), full text, pp. 1-6.
Vodafone. 3GPP TSG RAN Meeting #80 RP-181480; New SID: Study on NR V2X, La Jolla, USA, Jun. 11-14, 2018.
The first Office Action of corresponding Chinese application No. 201980092862.2, dated Aug. 2, 2023.
The second Office Action of corresponding Chinese application No. 201980092862.2, dated Oct. 12, 2023.
The EESR of corresponding European application No. 19940979.8. dated Jun. 27, 2022.
Samsung, Reselection Priorities Handling for NR V2X SL communication, R2-1907962, 3GPP TSG-RAN WG2 Meeting #106, Reno, USA, May 13-17, 2019.
MediaTek Inc., On cell reselection, R2-1906815, 3GPP TSG-RAN WG2 Meeting #106, Reno, USA, May 13-17, 2019.
CATT, Cell (Re-) selection Function in NR V2X Sidelink, R2-1905799, 3GPP TSG-RAN WG2 Meeting #106 Reno, USA, May 13-17, 2019.

\* cited by examiner

WIRELESS COMMUNICATION METHOD AND TERMINAL DEVICE

CROSS REFERENCE TO RELATED APPLICATION

This application is a continuation of International Application No. PCT/CN2019/100879, filed on Aug. 15, 2019. The above application is hereby incorporated by reference in its entirety.

TECHNICAL FIELD

Embodiments of the present application relate to the field of communication, and in particular, to a wireless communication method and a terminal device.

BACKGROUND

In the case that a terminal device (for example, a vehicle-mounted terminal) supports long term evolution (Long Term Evolution, LTE) sidelink communication, cell reselection may be performed. However, the terminal device may also support both LTE sidelink communication and new radio (New Radio, NR) sidelink communication. How to perform cell reselection when the terminal device supports both LTE sidelink communication and NR sidelink communication is a technical problem that needs to be solved urgently.

SUMMARY

The embodiments of the present application provide a wireless communication method and a terminal device, which can perform cell reselection when the terminal device supports both LTE sidelink communication and NR sidelink communication.

In a first aspect, a wireless communication method is provided, and the method includes:
  determining, by a terminal device, a carrier priority order of multiple carriers used for cell reselection according to a carrier attribute, where the carrier attribute is for sidelink communication of at least two networks.

In a second aspect, a terminal device is provided, and the terminal device is configured to execute the method in the foregoing first aspect or each implementation manner of the first aspect.

Specifically, the terminal device includes a functional module for executing the method in the foregoing first aspect or each implementation manner of the first aspect.

In a third aspect, a terminal device is provided, including a processor and a memory. The memory is used to store a computer program, and the processor is used to call and run the computer program stored in the memory to execute the method in the foregoing first aspect or each implementation manner of the first aspect.

In a fourth aspect, an apparatus is provided for implementing the method in each implementation manner of the foregoing first aspect.

Specifically, the apparatus includes: a processor configured to call and run a computer program from a memory, so that a device installed with the apparatus executes the method in each implementation manner of the foregoing first aspect.

In a fifth aspect, a computer readable storage medium is provided for storing a computer program that enables a computer to execute the method in each implementation manner of the foregoing first aspect.

In a sixth aspect, a computer program product is provided, the computer program product includes computer program instructions that cause a computer to execute the method in each implementation manner of the foregoing first aspect.

In a seventh aspect, a computer program is provided, the computer program, when running on a computer, causes the computer to execute the method in each implementation manner of the foregoing first aspect.

Through the above technical solutions, a terminal device determines a carrier priority order of multiple carriers used for cell reselection according to a carrier attribute, so that cell reselection can be performed when the terminal device supports both LTE sidelink communication and NR sidelink communication.

DESCRIPTION OF EMBODIMENTS

The technical solutions in the embodiments of the present application will be described below in conjunction with the drawings in the embodiments of the present application. Obviously, the described embodiments are a part of the embodiments of the present application, not all of the embodiments. Regarding the embodiments in the present application, all other embodiments obtained by a person of ordinary skill in the art without paying creative work shall fall within the scope of protection of the present application.

The embodiments of the present application can be applied to any terminal device-to-terminal device communication framework.

For example, vehicle to vehicle (Vehicle to Vehicle, V2V). Vehicle to everything (Vehicle to Everything, V2X), device to device (Device to Device, D2D), etc.

Where the terminal in the embodiments of the present application may be any device or apparatus configured with a physical layer and a media access control layer, and the terminal device may also be referred to as an access terminal. For example, user equipment (User Equipment, UE), a user unit, a user station, a mobile station, a mobile platform, a remote station, a remote terminal, a mobile device, a user terminal, a terminal, a wireless communication device, a user agent, or a user apparatus. The access terminal can be a cellular phone, a cordless phone, a session initiation protocol (Session Initiation Protocol, SIP) phone, a wireless local loop (Wireless Local Loop, WLL) station, a personal digital linear processing (Personal Digital Assistant, PDA), a handheld device, a computing device with a wireless communication function or other linear processing devices, vehicle-mounted devices, wearable devices connected to wireless modems, etc. A vehicle-mounted terminal is taken as an example for description in the embodiments of the present application, however, it is not limited thereto.

In an embodiment, in some embodiments of the present application, the embodiments of the present application may be applicable to the 3rd generation partnership project (3rd Generation Partnership Project, 3GPP) which defines two transmission modes, the two transmission modes are respectively denoted as: a mode A and a mode B.

Figure 1:
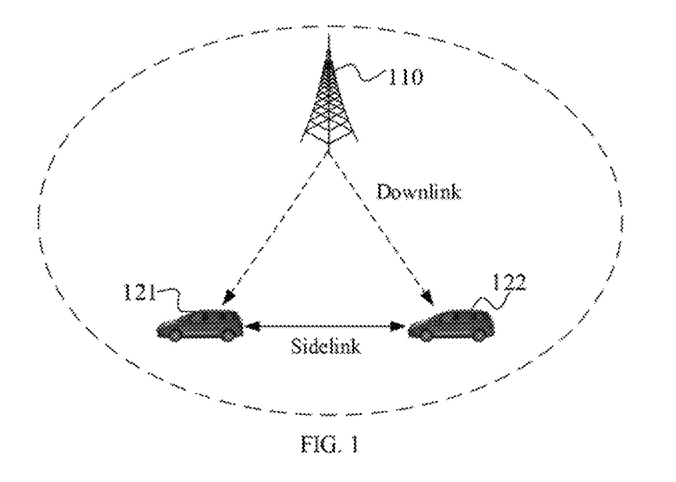
FIG. 1 is a schematic frame diagram of a transmission mode according to an embodiment of the present application.
Figure 2:
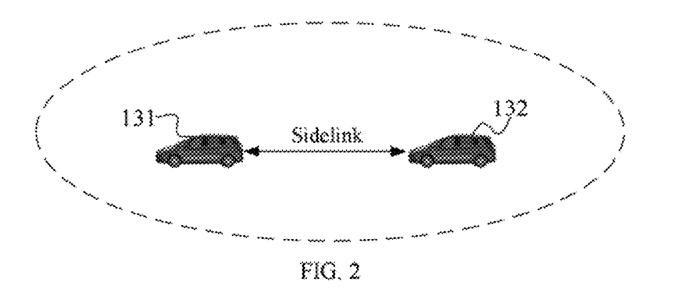
FIG. 2 is a schematic frame diagram of another transmission mode according to an embodiment of the present application.

FIG. 1 is a schematic diagram of the mode A according to an embodiment of the present application. FIG. 2 is a schematic diagram of the mode B according to an embodiment of the present application.

In the mode A shown in FIG. 1, transmission resources of vehicle-mourned terminals (a vehicle terminal 121 and a vehicle-mounted terminal 122) are allocated by a base station 110, and the vehicle-mounted terminals send data on a sidelink according to the resources allocated by the base station 110. Specifically, the base station 110 may allocate resources for a single transmission to the terminals, and may also allocate resources for semi-static transmission to the terminals.

In the mode B shown in FIG. 2, vehicle terminals (a vehicle terminal 131 and a vehicle terminal 132) adopt a sensing (sensing) and reservation (reservation) transmission mode, and the vehicle terminals select transmission resources independently from resources of a sidelink to perform data transmission.

In the following, the vehicle-mounted terminal 131 is taken as an example for detailed description.

The vehicle-mounted terminal 131 acquires a set of available transmission resources in a resource pool by means of sensing, and the vehicle-mounted terminal 131 randomly selects a transmission resource from this set for data transmission.

Since services in the Internet of vehicles system have periodic characteristics, in the embodiments of the present application, the vehicle-mounted terminal 131 may also adopt a semi-static transmission mode. That is, after acquiring a transmission resource, the vehicle-mounted terminal 131 continuously uses the transmission resource in multiple transmission periods to reduce the probability of resource reselection and resource conflict.

The vehicle-mounted terminal 131 can carry information about reserving the resource for the next transmission in control information transmitted this time, so that other terminals (for example, the vehicle-mounted terminal 132) can determine whether this resource is reserved and used by a user by detecting the control information of this user, thereby achieving the purpose of reducing resource conflict.

It should be noted that in NR V2X, a user may be in a mixed mode, that is, the user can use the mode A and the mode B for resource acquisition at the same time.

When the terminal device (for example, the vehicle-mounted terminal 131 or the vehicle-mounted terminal 132) only supports LTE sidelink communication, cell reselection can be performed in the following two ways.

Manner 1: an intra-carrier configuration scenario. Specifically, an LTE network is deployed on a carrier F1. The LTE network provides configuration for sidelink communication on the carrier F1. If the terminal device wishes to perform sidelink communication on the carrier F1, the terminal device regards the carrier F1 as a carrier with the highest priority, and the terminal device resides on the carrier F1 preferentially.

Manner 2: a cross-carrier configuration scenario. Specifically, an LTE network is deployed on a carrier F2, and the LTE network provides configuration on the carrier F2 for sidelink communication on the carrier F1. If the terminal device wishes to perform sidelink communication on the carrier F1, the terminal device regards the carrier F2 as a carrier with the highest priority, and the terminal device resides on the carrier F2 preferentially.

It should be noted that cell reselection can be divided into two stages: stage one, determining a resident carrier; stage two, determining a target cell on the resident carrier for accessing. The embodiments of the present application focus on the determination of the resident carrier.

NR V2X is discussed in 3GPP. The terminal device may support both LTE sidelink communication and NR sidelink communication, but the terminal device can only reside on one carrier. Therefore, how to design a cell reselection mechanism under a circumstance that the terminal device supports both LTE sidelink communication and NR sidelink communication is a problem to be solved in the present application.

Based on the above technical problem, the present application designs a wireless communication method in which cell reselection can be performed when the terminal device supports both LTE sidelink communication and NR sidelink communication.

Figure 3:
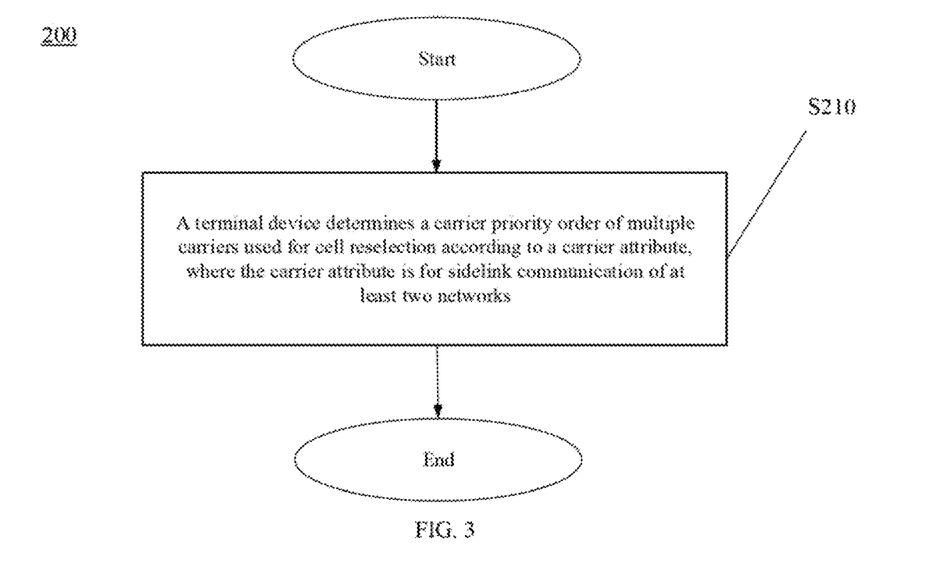
FIG. 3 is a schematic flowchart of a wireless communication method provided according to an embodiment of the present application.

FIG. 3 is a schematic flowchart of a wireless communication method 200 according to an embodiment of the present application. The method 200 may be executed by a terminal device. The term device shown in FIG. 3 may be a vehicle-mounted terminal as shown in FIG. 1 or FIG. 2.

As shown in FIG. 3, the method 200 may include some or all of the following contents:

S210: a terminal device determines a carrier priority order of multiple carriers used for cell reselection according to a carrier attribute, where the carrier attribute is for sidelink communication of at least two networks.

In the embodiment of the present application, the carrier priority order can be used for carrier selection for cell reselection. For example, the carrier with the highest priority in the carrier priority order is selected for residing. For another example, the carrier that can be searched out and ranked highest in the carrier priority order is selected for residing.

That is to say, in the embodiment of the present application, the terminal device can support sidelink communication of the at least two networks.

In an embodiment, the at feast two networks include an LTE network and an NR network. Of course, the at least two networks may also include some other networks, for example, an evolved long term evolution (Evolved Long Term Evolution, eLTE) and an advanced long term evolution (Advanced Long Term Evolution, LTE-A), which are not limited in the present application.

In an embodiment, for the intra-carrier configuration scenario, assuming that the terminal device needs to perform LTE sidelink communication on a carrier X, and needs to perform NR sidelink communication on a carrier Y and a carrier Z, and the LTE network provides configuration or parameters for sidelink communication on the carrier X through the carrier X, the NR network provides configuration or parameters for sidelink communication on the carrier Y through the carrier Y, and the NR network provides configuration or parameters for sidelink communication on the carrier Z through the carrier Z, that is, the multiple carriers may include some or all of the carrier X, the carrier Y, and the carrier Z.

In an embodiment, for the cross-carrier configuration scenario, assuming that the terminal device needs to perform LTE sidelink communication on a carrier X, and needs to perform NR sidelink communication on a carrier Y and a carrier Z, and the LTE network provides configuration or parameters for sidelink communication on the carrier X through a carrier F1 and a carrier F2, the NR network provides the configuration or parameters for sidelink communication on the carrier Y through carriers F3 and F4, and the NR network provides the configuration or parameters for sidelink communication on the carrier Z through a carrier F5. That is, the multiple carriers may include some or all oldie carrier X, the carrier Y, the carrier Z, the carrier F1, the carrier F2, the carrier F3, the carrier F4, and the carrier F5.

It should be noted that the configuration or parameters of the aforementioned sidelink communication may include the carrier attribute.

In an embodiment, in the embodiment of the present application, the carrier attribute includes but is not limited to at least one of the following:

the number of networks supported by a carrier in the at least two networks, a type of networks supported by the carrier in the at least two networks, and a type of configuration, information used by the terminal device for sidelink communication on the supported network.

In an embodiment, the type of the configuration information includes pre-configuration and network configuration.

In an embodiment, in the embodiment of the present application, the terminal device needs to acquire the carrier attribute in advance. For example, the terminal device acquires the carrier attribute according to a system broadcasting message.

In an embodiment, as a first embodiment, it is assumed that the at least two networks include a first network and a second network, and the multiple carriers include a first carrier. If the terminal device can perform sidelink communication of the first network and or the second network while residing on the first carrier, the terminal device determines that the first carrier has the highest priority among the multiple carriers.

For example, if the terminal device can perform UT E sidelink communication and/or NR sidelink communication only by residing on the first carrier, then the terminal device determines that the first carrier has the highest priority among the multiple carriers.

Further, in the first embodiment, if the terminal device can perform side communication of the first network and/or the second network according to the network configuration while reside on the first carrier, the terminal device determines that the first carrier has the highest priority among the multiple carriers.

Furthermore, in the first embodiment, if the terminal device cannot perform sidelink communication of the first network and/or the second network according to the network configuration while residing on a carrier other than the first carrier among the multiple carriers, the terminal device determines that the first carrier has the highest priority among the multiple carriers.

That is to say, if the terminal device can perform sidelink communication of the first network and/or the second network while residing on the first carrier, and the terminal device cannot perform sidelink communication of the first network and/or the second network while residing on a carrier other than the first carrier among the multiple carriers, the terminal device determines that the first carrier has the highest priority among the multiple carriers.

Or, if the terminal device can perform sidelink communication of the first network and/or the second network according to the network configuration while residing on the first carrier, and the terminal device cannot perform sidelink communication of the first network and/or the second network according to the network configuration while residing on a carrier other than the first carrier among the multiple carriers, the terminal device determines that the first carrier has the highest priority among the multiple carriers.

Furthermore, in the first embodiment, if the terminal device can only perform sidelink communication of the first network and/or the second network according to the pre-configuration while not residing on the first carrier, the terminal device determines that the first carrier has the highest priority among the multiple carriers.

That is to say, if the terminal device can perform sidelink communication of the first network and/or the second network while residing on the first carrier, and the terminal device can only perform sidelink communication of the first network and/or the second network according to the pre-configuration while not residing on the first carrier, the terminal device determines that the first carrier has the highest priority among the multiple carriers.

Or, if the terminal device can perform sidelink communication of the first network and/or the second network according to the network configuration while residing on the first carrier, and the terminal device can only perform sidelink communication of the first network and/or the second network according to the pre-configuration while not residing on the first carrier, the terminal device determines that the first carrier has the highest priority among the multiple carriers.

Furthermore, in the first embodiment, if the terminal device does not need to perform sidelink communication of the first network and/or the second network according to the pre-configuration while residing on the first carrier, the terminal device determines that the first carrier has the highest priority among the multiple carriers.

That is to say, if the terminal device can perform sidelink communication of the first network and/or the second network according to the network configuration while residing on the first carrier, and the terminal device does not need to perform sidelink communication of the first network and/or the second network according to the pre-configuration, the terminal device determines that the first carrier has the highest priority among the multiple carriers.

In an embodiment, as a second embodiment, assuming that the at least two networks include a first network and a second network, and the multiple carriers include a first carrier and a second carrier.

If the terminal device can perform sidelink communication of the first network and the second network while residing on the first carrier, and the terminal device can perform sidelink communication of the first network or the second network while residing on the second carrier, the terminal device determines that the first carrier has the highest priority among the multiple carriers.

If the terminal device can perform sidelink communication of the first network and the second network according to the network configuration while residing on the first carrier, and the terminal device needs to perform sidelink communication of the first network or the second network according to the pre-configuration while residing on the second carrier, the terminal device determines that the first carrier has the highest priority among the multiple carriers.

For example, if only by residing on a carrier A, the terminal device can perform LTE sidelink communication and NR sidelink communication, and only by residing on a carrier B, the terminal device can perform LTE sidelink communication or NR sidelink communication, then the carrier A is selected preferentially.

For another example, if the terminal device needs neither to perform pre-configured LTE sidelink communication nor to perform pre-configured NR sidelink communication while residing on the carrier A, and if the terminal device still needs to perform pre-configured LTE sidelink communication or NR sidelink communication while residing on the carrier B, then the carrier A is selected preferentially.

In an embodiment, in the second embodiment, if the terminal device is not configured with the first carrier or the first carrier is not searched out by the terminal device, the terminal device determines to select the second carrier preferentially.

It should be noted that, assuming that a priority of a carrier 1 is higher than a priority of a carrier 2, the terminal device selects the carrier 1 preferentially during cell reselection, and the terminal device searches for the carrier 1 preferentially. In the case that the carrier 1 is not configured or the carrier 1 is not searched out, the carrier 2 is selected preferentially.

Further, in the second embodiment, the second carrier includes a first subcarrier and a second subcarrier. If the terminal device needs to perform sidelink communication of the First network according to the pre-configuration while residing on the first subcarrier, and the terminal device needs to perform sidelink communication of the second network according to the pre-configuration while residing on the second subcarrier, then the terminal device determines priorities of the subcarriers according to a network to which a sidelink communication service needed to be performed belongs.

Specifically, if the sidelink communication service needed to be performed by the terminal device belongs to the second network, the terminal device determines that the priority of the first subcarrier is greater than the priority of the second subcarrier; or, if the sidelink communication service needed to be performed by the terminal device belongs to the first network, the terminal device determines that the priority of the second subcarrier is greater than the priority of the first subcarrier.

For example, assuming that the second carrier is a carrier B, and the carrier B includes a carrier B1 and a carrier B2. If the terminal device still needs to perform LTE sidelink communication according to the pre-configuration while residing on the carrier B1, and if the terminal device still needs to perform NR sidelink communication according to the pre-configuration while residing on the carrier B2, then the terminal device determines the priorities according to a service needed to be performed on the current sidelink. For example, if LTE sidelink communication is currently required, the carrier B2 is selected preferentially.

It should be noted that the sidelink communication service needed to be performed by the terminal device belongs to the first network can be understood as: a radio access technology (Radio Access Technology, RAT) and/or a carrier used by the sidelink communication service needed to be performed by the terminal device belongs to the first network. In the same way, the sidelink communication service needed to be performed by the terminal device belongs to the second network can be understood as: a RAT and/or a carrier used by the sidelink communication service needed to be performed by the terminal device belongs to the second network.

In an embodiment, in the foregoing embodiment 1 and embodiment 2, the first network is an LTE network, and the second network is an NR network; or, the first network is an NR network, and the second network is an LTE network.

It should be noted that the foregoing embodiment 1 and embodiment 2 can be combined with each other, which is not limited by the present application.

In an embodiment, in the embodiment of the present application, the terminal device performs, according to the carrier priority order, cell reselection for a target carrier on which sidelink communication needs to be performed.

It should be noted that, in the embodiment of the present application, it is considered that there may be a cross-carrier configuration scenario, that is, according to the carrier priority order, the preferentially selected carrier is not necessarily the carrier for sidelink communication. Therefore, the terminal device can perform, according to the carrier priority order, cell reselection for the target carrier on which sidelink communication needs to be performed.

Therefore, in the embodiment of the present application, a terminal device determines a carrier priority order of multiple carriers used for cell reselection according to a carrier attribute, so that cell reselection can be performed under a circumstance that the terminal device supports both LTE sidelink communication and NR sidelink communication.

Figure 4:
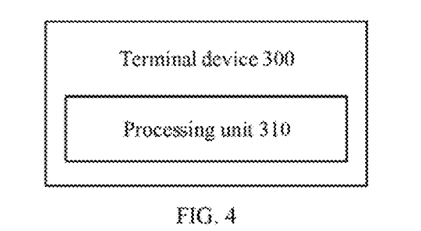
FIG. 4 is a schematic block diagram of a terminal device according to an embodiment of the present application.

FIG. 4 shows a schematic block diagram of a terminal device 300 according to an embodiment of the present application. As shown in FIG. 4, the terminal device 300 includes:

a processing unit 310, configured to determine a carrier priority order of multiple carriers used for cell reselection according to a carrier attribute, where the carrier attribute is for side communication of at least two networks.

In an embodiment, the carrier attribute includes at least one of the following:

a number of networks supported by a carrier in the at least two networks, a type of a network supported by the carrier in the at least two networks, and a type of configuration information used by the terminal device for sidelink communication on the supported network.

In an embodiment, the type of the configuration information includes pre-configuration and network configuration.

In an embodiment, the at least two networks include a first network and a second network, and the multiple carriers include a first carrier;

the processing unit 310 is specifically configured to:

determine that the first carrier has the highest priority among the multiple carriers, if the terminal device 300 is capable of performing sidelink communication of the first network and/or the second network while residing on the first carrier.

In an embodiment, the processing unit 310 is specifically configured to:

determine that the first carrier has the highest priority among the multiple carriers, if the terminal device 300 is capable of performing sidelink communication of the first network and/or the second network according to network configuration while residing on the first carrier.

In an embodiment, the processing unit 310 is specifically configured to:

determine that the first carrier has the highest priority among the multiple carriers if the terminal device 300 is not capable of performing side communication of the first network and/or the second network according to network configuration while residing on a carrier other than the first carrier among the multiple carriers; or, determine that the first carrier has the highest priority among the multiple carriers if the terminal device 300 is only capable of performing sidelink communication of the first network and/or the second network according to pre-configuration while not residing on the first carrier; or, determine that the first carrier has the highest priority among the multiple carriers if the terminal device 300 does not need to perform sidelink communication of the first network and/or the second network according to pre-configuration while residing on the first carrier.

In an embodiment, the at least two networks include a first network and a second network, and the multiple carriers include a first carrier and a second carrier;

the processing unit 310 is specifically configured to:

determine that the first carrier has the highest priority among the multiple carriers, if the terminal device 300 is capable of performing sidelink communication of the first network and the second network while residing on the first carrier and the terminal device 300 is capable of performing sidelink communication of the first network or the second network while residing on the second carrier; or, determine that the first cattier has the highest priority among the multiple carriers, if the terminal device 300 is capable of performing sidelink communication of the first network and the second network according to the network configuration while residing on the first carrier and the terminal device 300 needs to perform sidelink communication of the first network or the second network according to pre-configuration while residing on the second carrier.

In an embodiment, the processing unit 310 is further configured to:

determine to select the second carrier preferentially if the terminal device 300 is not configured with the first carrier or the first carrier is not searched out by the terminal device.

In an embodiment, the second carrier includes a first subcarrier and a second subcarrier, the processing unit 310 is further configured to:

determine priorities of the subcarriers according to a network to which the sidelink communication service needed to be performed belongs, if the terminal device 300 needs to perform sidelink communication of the first network according to pre-configuration while residing on the first subcarrier and the terminal device 300 needs to perform sidelink communication of the second network according to pre-configuration while residing on the second subcarrier.

In an embodiment, the processing unit 310 is specifically configured to:

determine that the priority of the first subcarrier is greater than the priority of the second subcarrier if the sidelink communication service needed to be performed by the terminal device 300 belongs to the second network; or, determine that the priority of the second subcarrier is greater than the priority of the first subcarrier if the sidelink communication service needed to be performed by the terminal device 300 belongs to the first network.

In an embodiment, where the sidelink communication service needed to be performed by the terminal device 300 belongs to the first network includes: a RAT and/or a carrier used by the sidelink communication service needed to be performed by the terminal device 300 belongs to the first network; of, where the sidelink communication service needed to be performed by the terminal device 300 belongs to the second network includes: a RAT and/or a carrier used by the sidelink communication service needed to be performed by the terminal device 300 belongs to the second network.

In an embodiment, the first network is an LTE network, and the second network is an NR network: or, the first network is an NR network, and the second network is an LTE network.

In an embodiment, the processing unit 310 is further configured to:

perform, according to the carrier priority order, cell reselection for a target carrier on which sidelink communication needs to be performed.

In an embodiment, the processing unit 310 is further configured to:

acquire the carrier attribute according to the system broadcasting message.

In an embodiment, the terminal device supports sidelink communication of the at least two networks.

It should be understood that the terminal device 300 according to the embodiment of the present application may correspond to the terminal device in the method embodiment of the present application, and the above-mentioned and other operations and/or functions of each unit in the terminal device 300 are to implement the corresponding process of the method 200 shown in FIG. 3, respectively, which will not be repeated here for the sake of brevity.

Figure 5:
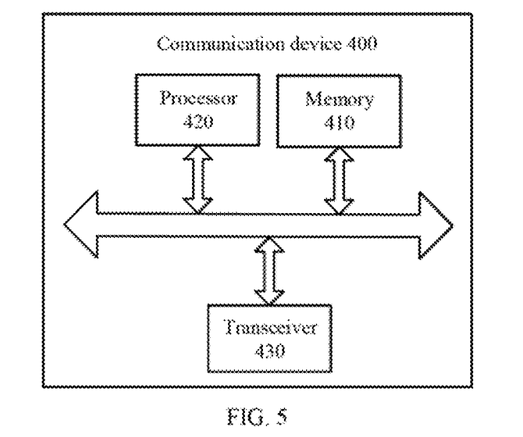
FIG. 5 is a schematic block diagram of a communication device according to an embodiment of the present application.

FIG. 5 is a schematic structural diagram of a communication device 400 provided by an embodiment of the present application. The communication device 400 shown in FIG. 5 includes a processor 410, and the processor 410 can call and run a computer program from a memory to implement the method in the embodiment of the present application.

In an embodiment, as shown in FIG. 5, the communication device 400 may further include a memory 420. The processor 410 may call and run a computer program from the memory 420 to implement the method in the embodiment of the present application.

The memory 420 may be a separate device independent of the processor 410, or may be integrated in the processor 410.

In an embodiment, as shown in FIG. 5, the communication device 400 may further include a transceiver 430, and the processor 410 may control the transceiver 430 to communicate with other devices. Specifically, it may send information or data to other devices, or receive information or data sent by other devices.

Where the transceiver 430 may include a transmitter and a receiver. The transceiver 430 may further include an antenna, and the number of antennas may be one or more.

In an embodiment, the communication device 400 may specifically be the network device in the embodiments of the present application, and the communication device 400 may implement the corresponding process implemented by the network device in each method of the embodiment of the present application. For the sake of brevity, details will not be repeated herein.

In an embodiment, the communication device 400 may specifically be the terminal device in the embodiments of the present application, and the communication device 400 may implement the corresponding process implemented by the terminal device in each method of the embodiment of the present application. For the sake of brevity, details will not be repeated herein.

Figure 6:
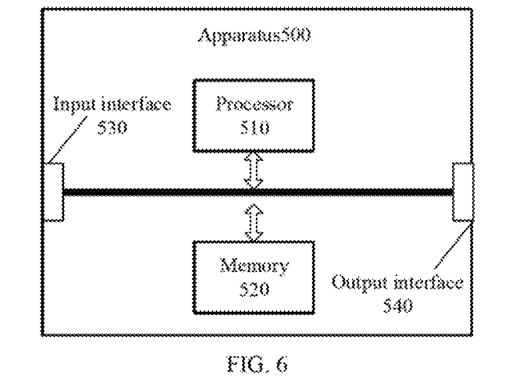
FIG. 6 is a schematic block diagram of an apparatus according to an embodiment of the present application.

FIG. 6 is a schematic structural diagram of an apparatus according to an embodiment of the present application. The apparatus 500 shown in FIG. 6 includes a processor 510, and the processor 510 can call and run a computer program from the memory to implement the method in the embodiment of the present application.

In an embodiment, as shown in FIG. 6, the apparatus 500 may further include a memory 520. The processor 510 may call and run a computer program from the memory 520 to implement the method in the embodiment of the present application.

The memory 520 may be a separate device independent of the processor 510 or may be integrated in the processor 510.

In an embodiment, the apparatus 500 may further include an input interface 530. The processor 510 can control the input interface 530 to communicate with other devices or chips, and specifically, can acquire information or data sent by other devices or chips.

In an embodiment, the apparatus 500 may further include an output interface 540. The processor 510 can control the output interface 540 to communicate with other devices or chips, and specifically, it can output information or data to other devices or chips.

In an embodiment, the apparatus can be applied to the network device in the embodiments of the present application, and the apparatus can implement the corresponding process implemented by the network device in the various methods of the embodiments of the present application. For the sake of brevity, details are not repeated herein.

In an embodiment, the apparatus can be applied to the terminal device in the embodiment of the present application, and the apparatus can implement the corresponding process implemented by the terminal device in each method of the embodiment of the present application. For the sake of brevity, details are not repeated herein.

In an embodiment, the apparatus mentioned in the embodiments of the present application may also be a chip. For example, it can be a system-level chip, a system chip, a chip system, or a system-on-chip chip.

Figure 7:
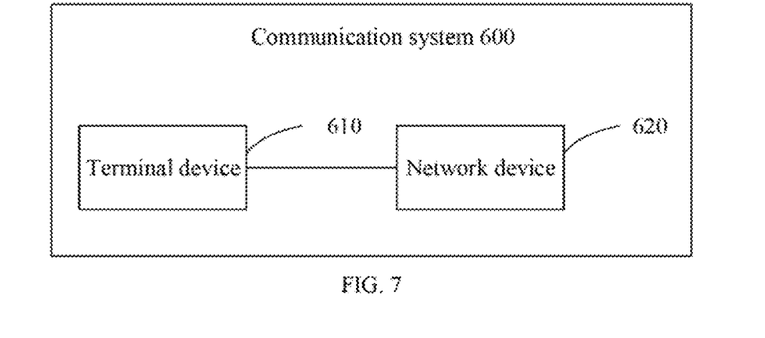
FIG. 7 is a schematic block diagram of a communication system according to an embodiment of the present application.

FIG. 7 is a schematic block diagram of a communication system 600 according to an embodiment of the present application. As shown in FIG. 7, the communication system 600 includes a terminal device 610 and a network device 620.

Where the terminal device 610 can be used to implement the corresponding function implemented by the terminal device in the above method, and the network device 620 can be used to implement the corresponding function implemented by the network device in the above method. For the sake of brevity, details are not repeated herein.

It should be noted that, the processor in the embodiments of the present application may be an integrated circuit chip with signal processing capabilities. In the implementation process, the steps of the foregoing method embodiments can be completed by hardware integrated logic circuits in the processor or instructions in the form of software. The aforementioned processor can be a general-purpose processor, a digital signal processor (Digital Signal Processor, DSP), an application specific integrated circuit (application specific integrated circuit, ASIC), a field programmable gate array (Field Programmable Gate Array, FPGA) or other programmable logic means, discrete gates or transistor logic means, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module can be located in a mature storage medium in the field, such as a random access memory, flash memory, a read only memory, a programmable read only memory, or an electrically erasable programmable memory, a register. The storage medium is located in the memory, and the processor reads the information in the memory and completes the steps of the above method in combination with its hardware.

It could be understood that the memory in the embodiments of the present application may be a volatile memory or a non-volatile memory, or may include both volatile and non-volatile memories. Among them, the non-volatile memory can be a read-only memory (Read-Only Memory, ROM), a programmable read-only memory (Programmable ROM, PROM), an erasable programmable read only memory (Erasable PROM, EPROM), an electrically erasable programmable read-only memory (Electrically EPROM, EEPROM) or a flash memory. The volatile memory may be a random access memory (Random Access Memory, RAM), which is used as an external cache. By way of exemplary but not restrictive description, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate SDRAM (DDR SDRAM), an enhanced synchronous dynamic random access memory (Enhanced SDRAM, ESDRAM), synchronous link dynamic random access memory (Synchlink DRAM SLDRAM) and a direct ram bits RAM (Direct Rambus RAM, DR RAM). It should be noted that the memory in the systems and methods described herein is intended to include, but not limited to, these and any other suitable types of memories It should be understood that the foregoing memory is exemplary but not restrictive. For example, the memory in the embodiment of the present application may also be a static random access memory (Static RAM, SRAM), a dynamic random access memory (Dynamic RAM, DRAM), and a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous connection dynamic random access memory (Synch Link DRAM, SLDRAM) and a Direct Rambus RAM (Direct Rambus RAM, DR RAM) and so on. That is to say, the memory in the embodiments of the present application is intended to include, but is not limited to, these and any other suitable types of memories.

The embodiments of the present application also provide a computer-readable storage medium for storing a computer program.

In an embodiment, the computer-readable storage medium can be applied to the network device in the embodiments of the present application, and the computer program causes a computer to execute the corresponding process implemented by the network device in each method of the embodiments of the present application. For the sake of brevity, details are not described herein again.

In an embodiment, the computer-readable storage medium can be applied to the terminal device in the embodiments of the present application, and the computer program causes the computer to execute the corresponding process implemented by the terminal device in each method of the embodiments of the present application. For the sake of brevity, details are not described herein again.

The embodiments of the present application also provide a computer program product including computer program instructions.

In an embodiment, the computer program product can be applied to the network device in the embodiments of the present application, and the computer program instructions cause a computer to execute the corresponding process implemented by the network device in each method of the embodiments of the present application. For the sake of brevity, details are not described herein again.

In an embodiment, the computer program product can be applied to the terminal device in the embodiments of the present application, and the computer program instructions cause a computer to execute the corresponding process implemented by the terminal device in each method of the embodiments of the present application. For the sake of brevity, details are not described herein again.

The embodiment of the present application also provides a computer program.

In an embodiment, the computer program can be applied to the network device in the embodiments of the present application. When the computer program is running on a computer, the computer is caused to execute the corresponding process implemented by the network device in each method of the embodiments of the present application. For the sake of brevity, details are not described herein again.

In an embodiment, the computer program can be applied to the terminal device in the embodiment of the present application. When the computer program is running on a computer, the computer is caused to execute the corresponding process implemented by the terminal device in each method of the embodiments of the present application. For the sake of brevity, details are not described herein again.

A person of ordinary skill in the art may be aware that the units and algorithm steps of the examples described in the embodiments disclosed in this document can be implemented by electronic hardware or a combination of computer software and electronic hardware. Whether these functions are executed by hardware or software depends on the specific application and design constraint conditions of the technical solutions. Professionals and technicians can use different methods for each specific application to implement the described functions, but such implementation should not be considered as beyond the scope of the present application.

Those skilled in the art can clearly understand that, for the convenience and conciseness of description, for the specific working process of the system, apparatus and unit described above, reference can be made to the corresponding process in the foregoing method embodiment, which will not be repeated here.

In the several embodiments provided m the present application, it should be understood that the disclosed system, apparatus, and method may be implemented in other ways. For example, the apparatus embodiment described above is only illustrative. For example, the division of the unit is only a logical function division. In actual implementations, there may be other division methods. For example, multiple units or components may be combined or may be integrate into another system, or some features can be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the function is implemented in the form of a software functional unit and sold or used as an independent product, it can be stored in a computer readable storage medium. For this understanding, the technical solution of the present application essentially or the part that contributes to the existing technology or a part of the technical solution can be embodied in the form of a software product, and the computer software product is stored in a storage medium, includes several instructions so as to make a computer device (which may be a personal computer, a server, or a network device, etc.) execute all or part of the steps of the methods described in the various embodiments of the present application. The aforementioned storage medium includes: a U disk, a mobile hard disk, a read-only memory (Read-Only Memory, ROM), a random access memory (Random Access Memory, RAM), a magnetic disk or an optical disk and other mediums that can store program codes.

The above are only specific implementations of the present application, but the scope of protection of the present application is not limited thereto. Any person skilled in the art can easily think of changes or substitutions within the technical scope disclosed in the present application, and the changes or substitutions should be covered within the scope of protection of the present application. Therefore, the scope of protection of the present application shall be subject to the scope of protection of the claims.

What is claimed is:

1. A wireless communication method, comprising:
    acquiring, by a terminal device, a carrier attribute according to a system broadcasting message; and
    determining, by the terminal device, a carrier priority order of multiple carriers configured for cell reselection according to the carrier attribute,
    wherein the carrier attribute is configured for sidelink communication and comprises network types of at least two networks supported by a carrier,
    wherein the at least two networks comprise a first network and a second network, and the multiple carriers comprise a first carrier;
        the first network is a long term evolution (LTE) network, and the second network is a new radio (NR) network; or,
        the first network is an NR network, and the second network is an LTE network; and
    determining, by the terminal device the carrier priority order of the multiple carriers configured for cell reselection according to the carrier attribute comprises:
        determining, by the terminal device, that the first carrier has the highest priority among the multiple carriers upon determining that the terminal device is capable of performing sidelink communication of the first network and the second network according to network configuration while residing on the first carrier.

2. The method according to claim 1, wherein the carrier attribute further comprises at least one of the following:
a number of networks supported by a carrier in the at least two networks, and a type of configuration information used by the terminal device for sidelink communication on the supported network.

3. The method according to claim 2, wherein the type of the configuration information comprises pre-configuration and network configuration.

4. The method according to claim 1, wherein the method further comprises:
determining, by the terminal device, to select a second carrier preferentially upon determining that the first carrier is not searched out by the terminal device.

5. The method according to claim 4, wherein the second carrier comprises a first subcarrier and a second subcarrier, the method further comprises:
determining, by the terminal device, priorities of the subcarriers according to a network to which a sidelink communication service needed to be performed belongs, upon determining that the terminal device needs to perform sidelink communication of the first network according to pre-configuration while residing on the first subcarrier and the terminal device needs to perform sidelink communication of the second network according to pre-configuration while residing on the second subcarrier.

6. The method according to claim 1, wherein the method further comprises:
performing, by the terminal device according to the carrier priority order, cell reselection for a target carrier on which sidelink communication needs to be performed.

7. A terminal device, comprising a processor and a memory, the memory is used to store a computer program, and the processor is used to call and run the computer program stored in the memory to:
acquire a carrier attribute according to a system broadcasting message; and
determine a carrier priority order of multiple carriers configured for cell reselection according to the carrier attribute,
wherein the carrier attribute is configured for sidelink communication and comprises network types of at least two networks supported by a carrier,
wherein the at least two networks comprise a first network and a second network, and the multiple carriers comprise a first carrier;
the first network is a long term evolution (LTE) network, and the second network is a new radio (NR) network; or,
the first network is an NR network, and the second network is an LTE network; and
the processor is specifically enabled to:
determine that the first carrier has the highest priority among the multiple carriers upon determining that the terminal device is capable of performing sidelink communication of the first network and the second network according to network configuration while residing on the first carrier.

8. The terminal device according to claim 7, wherein the carrier attribute further comprises at least one of the following:
a number of networks supported by a carrier in the at least two networks, and a type of configuration information used by the terminal device for sidelink communication on the supported network.

9. The terminal device according to claim 8, wherein the type of the configuration information comprises pre-configuration and network configuration.

10. The terminal device according to claim 7, wherein the processor is further enabled to:
determine to select a second carrier preferentially upon determining that the first carrier is not searched out by the terminal device.

11. The terminal device according to claim 7, wherein the processor is further enabled to:
perform, according to the carrier priority order, cell reselection for a target carrier on which sidelink communication needs to be performed.

12. A non-transitory computer readable storage medium, wherein the computer readable storage medium is used to store a computer program that enables a device to execute the method of:
acquiring a carrier attribute according to a system broadcasting message; and
determining a carrier priority order of multiple carriers configured for cell reselection according to the carrier attribute, wherein the carrier attribute is configured for sidelink communication and comprises network types of at least two networks supported by a carrier,
wherein the at least two networks comprise a first network and a second network, and the multiple carriers comprise a first carrier;
the first network is a long term evolution (LTE) network, and the second network is a new radio (NR) network; or,
the first network is an NR network, and the second network is an LTE network, and
determining the carrier priority order of the multiple carriers configured for cell reselection according to the carrier attribute comprises:
determining that the first carrier has the highest priority among the multiple carriers upon determining that the terminal device is capable of performing sidelink communication of the first network and the second network according to network configuration while residing on the first carrier.

* * * * *